UNITED STATES PATENT OFFICE.

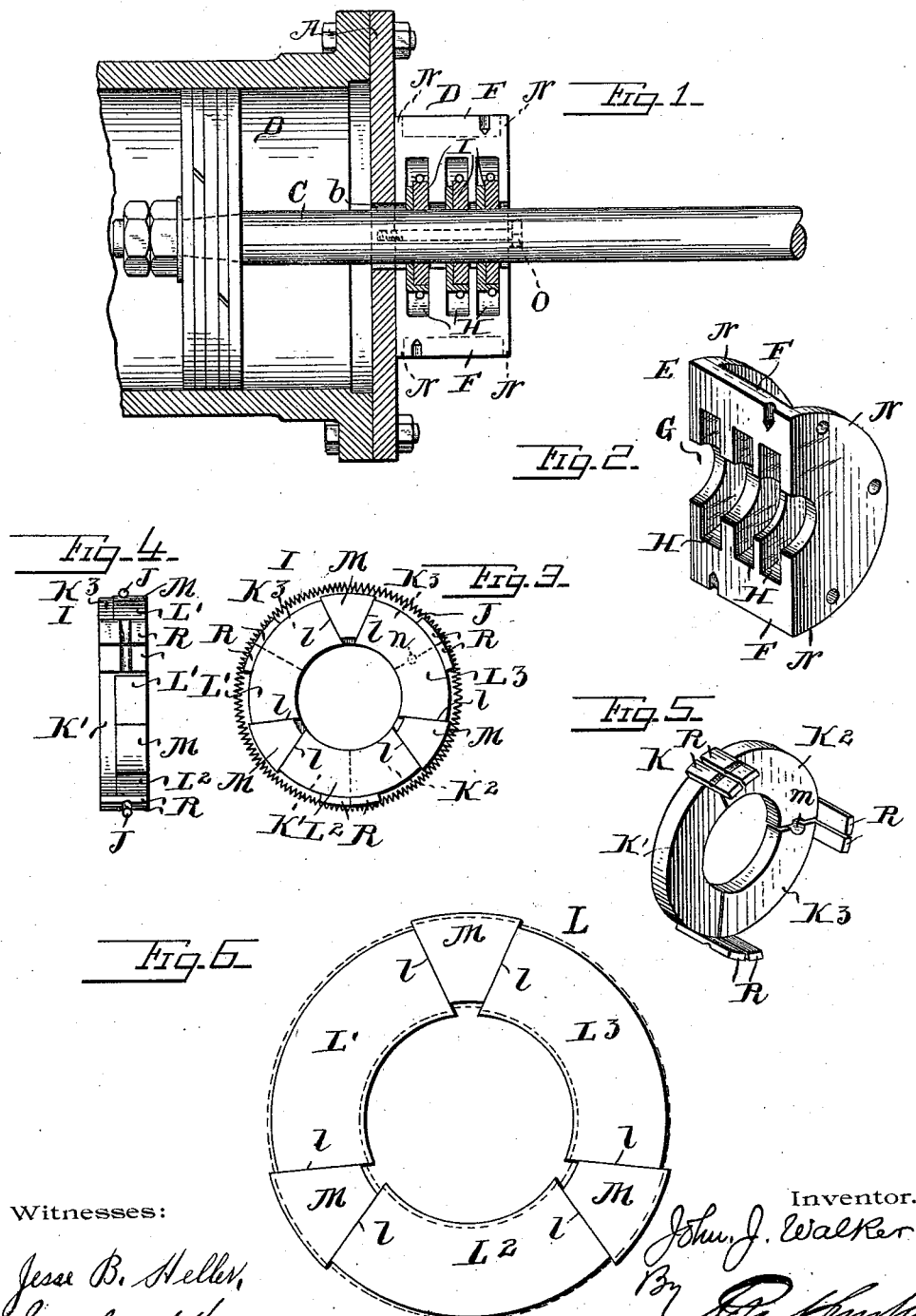

JOHN J. WALKER, OF PHILADELPHIA, PENNSYLVANIA.

STEAM-PACKING FOR PISTON-RODS.

SPECIFICATION forming part of Letters Patent No. 525,434, dated September 4, 1894.

Application filed February 23, 1894. Serial No. 501,065. (No model.)

*To all whom it may concern:*

Be it known that I, JOHN J. WALKER, of the city and county of Philadelphia and State of Pennsylvania, have invented an Improvement in Steam-Packing for Piston-Rods, of which the following is a specification.

My invention relates to steam packing for piston rods, &c., and consists of certain improvements which are fully set forth in the following specification and are shown in the accompanying drawings.

My improvements relate partly to the construction of a sectional metallic packing ring in such a way as to equalize and render uniform the pressure of the ring sections upon the piston rod. There is a tendency in segmental packing rings for the sections or segments to bear with a variable pressure upon the piston rod, as the pressure of the steam acting on the peripheries of the segments varies with the stroke of the piston, and this variation in the resulting friction upon the piston rod produces uneven wearing.

It is one of the objects of my invention to obviate this objection, by so constructing the segmental ring that the pressure of the segments upon the rod will be maintained at a substantially uniform degree. In the attainment of this object I employ a segmental metal ring having the ends of the segments tapered outwardly so as to form wedge shaped interstices between the ends of adjacent segments, and in these wedge shaped interstices I place wedge shaped equalizing blocks adapted to act upon the tapered ends of the segments but not making any contact with the rod. The externally acting steam pressure upon these equalizing blocks tends to force them inward, and as the inward movement of these blocks acts to force the packing segments outward, or to expand the ring, this tendency of the equalizing wedges to move in and thus force the segments out counteracts the tendency of the segments to move in under the steam pressure acting on their outer peripheries and a condition of equilibrium is produced.

It is also an object of my invention to simplify the construction of metallic packing rings so that they may be easily applied or removed.

My invention also includes improvements in the construction of the packing ring case or stuffing box, whereby it may be easily applied, removed, and reversed as is more fully set forth hereinafter.

I shall now refer to the accompanying drawings for the purpose of more particularly describing my improvements.

Figure 1 is a longitudinal vertical sectional view of a cylinder head having my improved piston rod packing applied. Fig. 2 is a perspective view of one of the members of the ring case or stuffing box. Fig. 3 is a plan view of one of my improved metallic packing rings. Fig. 4 is an elevation of the same. Fig. 5 is a perspective view of one of the segmental rings. Fig. 6 is a diagrammatic plan view of the packing ring illustrating the action thereof.

A is the cylinder head.
B is the piston.
C is the piston rod.
D is the stuffing box which contains the packing rings, and is bolted to the cylinder head. This stuffing box preferably consists of two semi cylindrical sections E adapted to be bolted through the flanges F. Each member of the stuffing box is provided with a longitudinal semicircular groove G forming, when the two members are clamped together, a circular aperture to receive the piston rod C, of a diameter greater than the diameter of the piston rod. The sections E of the stuffing box D are also provided with one or more internal semicircular grooves H to receive the packing rings I. In the drawings I have shown three of such annular grooves and three packing rings. A greater or less number may of course be employed as may be desired.

The packing rings I are of peculiar construction, and consist of two segmental rings K, L laid side by side to break joints, with expanding wedge pieces between the segments of one ring, and a surrounding ring spring J to hold the rings and segments together.

The segmental ring K is composed of a series of segments $K'$, $K^2$, $K^3$, each provided on its outer edge adjacent to its ends with projecting lugs R, which are butted together as shown in Fig. 5 when the ring K is made up.

The segmental ring L is similarly composed of segments $L'$, $L^2$, $L^3$, the ends of which are tapered outwardly, *i. e.*, converging toward the center as shown at $l$, to form wedge shaped interstices between the ends of adjacent segments.

M are wedge shaped pieces located in these wedge shaped interstices between the segments of the ring L, but not making contact with the piston rod, so that they will bear upon the tapered ends $l$ of the segments of the ring L. The segmental ring L with its interposed wedge pieces M is laid upon the ring K as shown in Fig. 4, with its pieces laid to break joints with the pieces of the ring K, and the lugs R extending upward across the outer periphery of the pieces of the ring L. The annular spring J surrounds the periphery of the packing ring thus formed, lying on the lugs R and thus binding the parts together. Through the employment of the lugs R on the pieces of the ring K the segments of the packing ring as an entirety are held together with an equally distributed pressure, the pressure, exerted on the lugs R by the spring, acting on the segments of the ring L between their ends, and a single spring is sufficient to hold the segments together.

In applying the packing ring to the piston rod the segments are assembled about it in the manner described and the spring J is applied. The stuffing box sections are then fitted upon the ring or rings and are secured to the cylinder head.

The inner partly circular faces of the segments $K'$, $K^2$, $K^3$ and $L'$, $L^2$, $L^3$, bear against the rod C and make a tight packing.

Such steam as makes its way through the space $b$ between the cylinder head and the piston rod into the stuffing box, and passes thence into the grooves G, will act upon the outer periphery of the rings tending to force the segments thereof inward into closer frictional contact with the piston rod. As this steam pressure, acting externally upon the periphery of the packing rings, varies with different positions in the stroke of the piston rod and its piston, the tendency would ordinarily be to force the segments of the packing ring with greater frictional contact upon the piston rod at one part of its stroke than at another. As the friction and consequent wear would thus be greater at one part of the stroke than at another there would be a tendency for the piston rod to wear away unevenly or in a taper. It is to prevent this and to equalize and maintain a uniform pressure upon the piston rod that I employ the intermediate wedge shaped sections M interposed between the tapered sides of the segments $L'$, $L^2$, $L^3$, and bearing upon their tapered ends. It will be observed that these wedge shaped sections M do not make contact with the piston rod but act solely upon the outwardly tapered ends of the segments $L'$, $L^2$, $L^3$. Consequently when these sections M are forced inward they will force the sections $L'$, $L^2$, $L^3$, outwardly and will thus expand the ring L, and cause the bearing faces of the segments thereof to bear less heavily upon the piston rod C. This outward movement of the segments $L'$, $L^2$, $L^3$, is due to the fact that the ends of the segments are tapered outwardly, i. e. converging in a direction toward the center. Now as the steam pressure acting externally upon the periphery of the packing ring tends to press the segments $L'$ $L^2$ $L^3$ inward with greater pressure upon the piston rod, it at the same time acts upon the outer surfaces of the pieces M and thus forces them inward, and thus forces the segments $L'$, $L^2$, $L^3$, outward, so that these two forces acting oppositely tend to maintain a state of equilibrium; and thus a uniform pressure of the segments $L'$, $L^2$, $L^3$, upon the piston rod is maintained. This operation is clearly illustrated in Fig. 6. As the lugs R of the sections $K'$, $K^2$, $K^3$, project over the outer edges of the segments $L'$, $L^2$, $L^3$ it is apparent that the tendency of the sections $L'$, $L^2$, $L^3$, to move outwardly under the action of the blocks M will be correspondingly communicated to the sections $K'$, $K^2$, $K^3$, and the ring K will also tend to expand. Thus the blocks M act to expand both rings and thus to balance the packing ring as an entirety.

For the purpose of accurately fitting the two rings K and L together so as to break joints, one or more of the segments of the ring L may be provided with a pin or lug $n$ adapted to fit between notches $m$ in the ends of two of the segments of the ring K.

While I have shown the two rings K and L made in three segments, it is to be understood that I do not limit myself to the use of any particular number of segments.

The ring case or stuffing box D is reversible, so that whenever the outer faces of the sides of the grooves G become worn owing to the outward pressure of the rings upon them, the box may be reversed to present the other side of the grooves to the outward pressure of the rings.

To permit the boxes to be easily reversed the sections are provided with flanges N at each end, through which the fastening bolts O pass to attach the box to the cylinder head. To reverse the box it is necessary only to disconnect the two sections, unfasten them from the head and then turn them and again screw them to the head. With the stuffing box of the construction described, a separate ring case is not required, as the rings may be carried directly in the stuffing box.

The minor details of construction shown may be varied without departing from the invention.

What I claim as new, and desire to secure by Letters Patent, is—

1. A metallic packing ring for piston rods, composed of a series of segmental packing pieces having tapered ends converging in a direction toward the center of the ring and forming wedge shaped interstices between the ends of succeeding pieces, and intermediate wedge shaped equalizing blocks located in the wedge shaped interstices with their inner ends at a greater distance from the center of the ring than the inner bearing faces of the segmental packing piece so as not to be in contact with the piston rod and acting upon the tapered ends of the packing pieces, whereby any tendency of the said equalizing blocks to move inwardly tends to move the segmental packing pieces outward away from the piston rod.

2. A metallic packing, consisting of the segmental rings K and L held side by side to break joints, the segments of the ring L, having outwardly tapered ends converging in a direction toward the center, wedge shaped equalizing blocks M located between the tapered ends of adjacent segments of the ring L and having their inner ends at a greater distance from center of the packing than the inner faces of the segments of the ring L, whereby any tendency of the equalizing blocks to move inward tends to force the segments of the ring L outward, and the segments of the ring K being provided with projecting portions or lugs extending over the outside of the segments of the ring L, whereby the segments of the ring K will be correspondingly moved with the segments of the ring L under the action of the blocks M.

3. A metallic packing consisting of the segmental rings K and L laid side by side to break joints, the segments of the ring L having outwardly tapered ends converging in a direction toward the center, and wedge shaped equalizing blocks M located between the tapered ends of adjacent segments of the ring L and having their inner ends at a greater distance from the center of the packing than the inner faces of the segments of the ring L whereby any tendency of the equalizing blocks to move inward tends to force the segments of the ring L outward.

4. A reversible stuffing box for piston rods consisting of longitudinally divided sections provided with a series of internal grooves H to receive the independent packing rings and with the lateral flanges N, N, at their ends, whereby the box may be secured to the head of the cylinder and may be reversed when the grooves become worn.

In testimony of which invention I have hereunto set my hand.

JOHN J. WALKER.

Witnesses:
  THOS. WALKER, Jr.,
  ERNEST HOWARD HUNTER.